Jan. 15, 1929. Re. 17,197

W. C. EPSTEIN

INCINERATOR FOR GARBAGE AND THE LIKE

Original Filed Oct. 26, 1925 2 Sheets-Sheet 1

Jan. 15, 1929. Re. 17,197

W. C. EPSTEIN

INCINERATOR FOR GARBAGE AND THE LIKE

Original Filed Oct. 26, 1925 2 Sheets-Sheet 2

INVENTOR.
W. C. EPSTEIN.
By Edmund A. Reed
ATTORNEY.

Reissued Jan. 15, 1929. Re. 17,197

UNITED STATES PATENT OFFICE.

WILLIAM C. EPSTEIN, OF DAYTON, OHIO, ASSIGNOR TO THE DUO-TOR MANUFACTURING COMPANY, OF DAYTON, OHIO, A CORPORATION OF OHIO.

INCINERATOR FOR GARBAGE AND THE LIKE.

Original No. 1,643,206, dated September 20, 1927, Serial No. 64,812, filed October 26, 1925. Application for reissue filed November 30, 1928. Serial No. 322,933.

This invention relates to an incinerator for garbage or the like and one object of the invention is to provide a domestic incinerator which will be simple in its construction, efficient in its operation and which can be operated at a relatively low cost.

A further object of the invention is to provide such an incinerator in which the burners will not be liable to be clogged by ashes or falling pieces of refuse, and which will be otherwise of such a character that it can be easily maintained in an operative condition.

A further object of the invention is to provide such an incinerator having associated therewith a water heater in which the water will be heated by the same flame which consumes the garbage and in which the garbage will not come in contact with the heater.

A further object of the invention is to provide an incinerator in which the garbage will be subjected to the drying action of heat during the intervals between burning operations.

A further object of the invention is to provide such an apparatus which can be easily manufactured and assembled and so produced at a relatively low cost.

Other objects of the invention will appear as the apparatus is described in detail.

Figure 1:
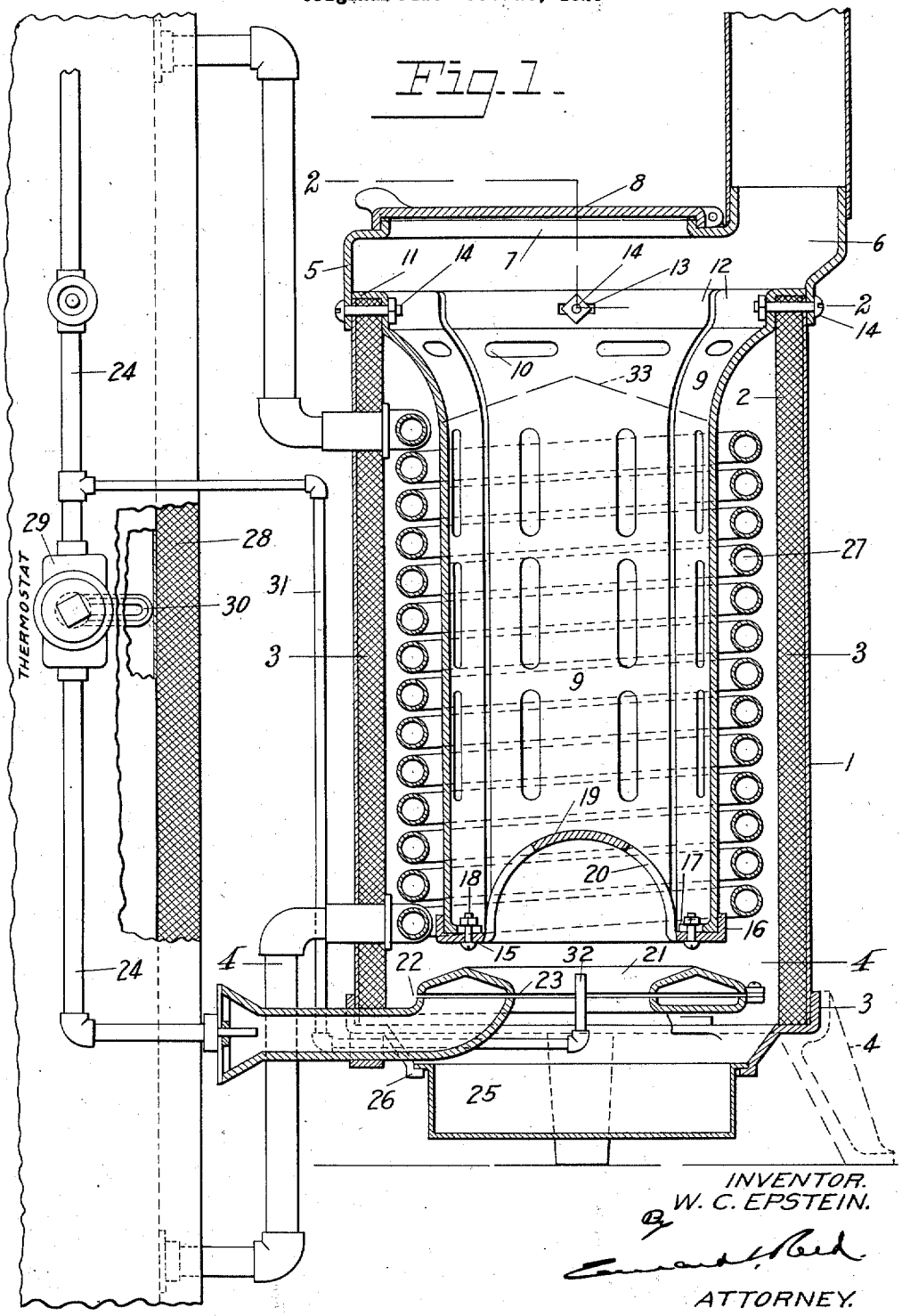
Figure 2:
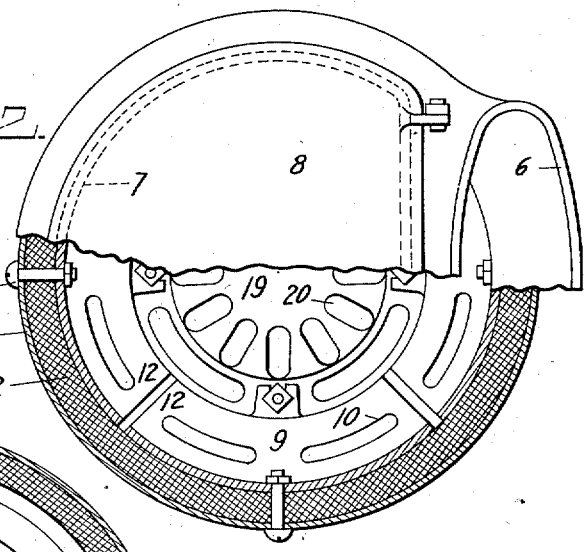
Figure 3:
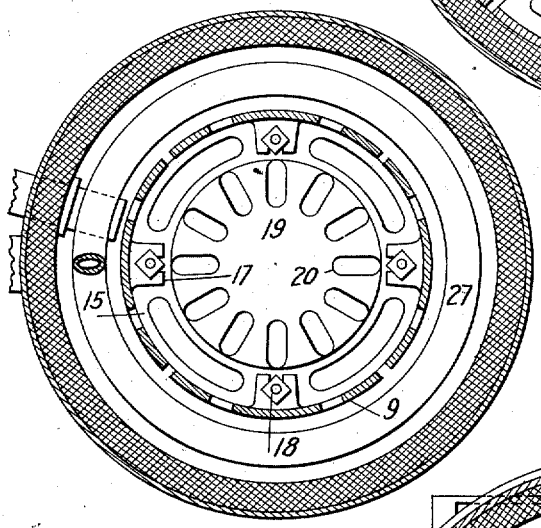
Figure 4:
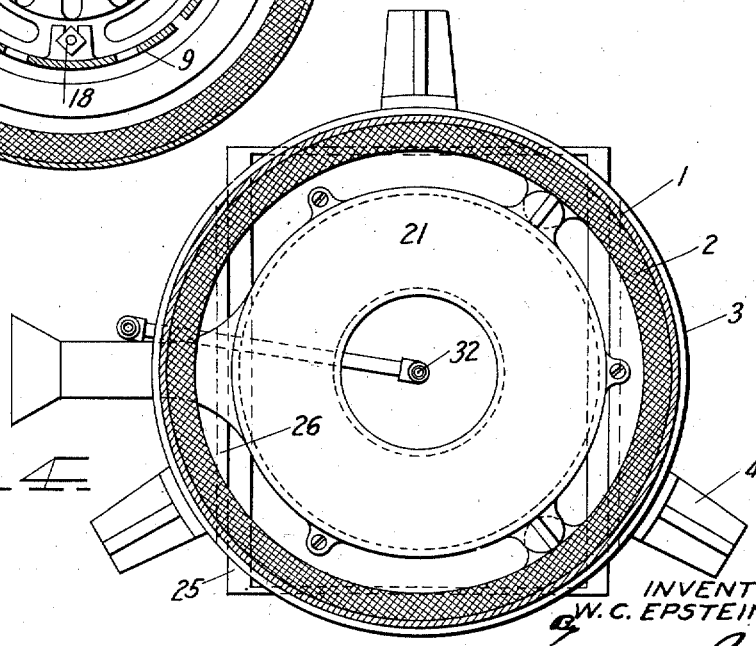

In the accompanying drawings Fig. 1 is a vertical sectional view of an incinerator embodying my invention and showing a portion of the water tank in elevation; Fig. 2 is a section taken on the line 2—2 of Fig. 1; Fig. 3 is a section taken on the line 3—3 of Fig. 1; and Fig. 4 is a section taken on the line 4—4 of Fig. 1.

In these drawings I have illustrated one embodiment of my invention and have shown the same as comprising a housing which, in the present form of the apparatus, consists of a cylindrical body portion 1 preferably provided with a lining 2 of asbestos or other heat insulating material. This body portion of the housing is supported at its lower end on a base 3 which may, if desired, be provided with standards or legs 4 to support the housing in a slightly elevated position. A top casting 5 is secured to the upper end of the cylindrical body portion 1 and is provided with an outlet 6 for products of combustion and with an inlet 7 which is closed by a hinged door 8, the door and the top casting having overlapping flanges to provide a tight closure.

Mounted within the housing, which constitutes a combustion chamber, is a hopper 9 which is preferably supported at its upper end on the housing, has its side walls spaced some distance from the walls of the cylindrical body portion of the housing and terminates a short distance above the base 3. The walls of the housing are perforated, as shown at 10, to permit the passage of heat and to give the hopper more or less of the characteristics of a grate. I have here shown the hopper as having its upper end flared so that the top of the hopper is of a diameter substantially equal to the interior diameter of the cylindrical portion of the housing and the hopper may have at its upper end an outwardly extending flange 11 which rests upon the upper end of the cylindrical body portion of the housing. If desired, the hopper may be made in a plurality of sections 12 each of which is individually secured to the housing in such a manner as to support the section in proper relation to the walls of the housing and to the other sections of the hopper. In the present construction each section is provided with a transverse slot 13 through which extends a bolt 14 which serves to secure the section of the hopper to the housing, the bolt in the present instance passing through both the body portion of the housing and the top casting and serving to connect the three parts one to the other. The transverse slots 13 permit the easy assembling and positioning of the sections of the hopper, and enable the hopper to be made more or less roughly, as by casting, and assembled without the necessity of an exact positioning of the several sections. The several sections may be of a combined width slightly less than the total circumference of the hopper as it is not objectionable to have a space or slot between the edges of the adjacent sections, and in this manner the assembly of the hopper and its mounting in the housing is greatly facilitated. The hopper is provided at its lower end with a closure 15 which is preferably perforated. As here shown, this closure is circular in form and is provided about its peripheral edge with an upstanding flange 16 which forms a seat to receive the lower ends of the several sections of the hopper. Each section of the hopper is provided with a slotted lug 17 which is secured to the closure 15 by means of a bolt 18, thereby rigidly securing the closure to the hopper and rigidly connecting the lower ends of the several sections of the hopper and maintaining the latter in their proper relation one to the other. The closure 15 has a central portion 19 extending upwardly into the hopper to a point some distance above the lower end of the hopper, this upwardly extending portion being here shown as dome shaped. The dome shaped portion of the closure is spaced from the side walls of the hopper so that it will extend into and be surrounded by the garbage which is to be consumed. The upwardly extending portion of the closure is also perforated and preferably the perforations are in the form of slots 20 formed in the lateral portions thereof and the central top portion of the dome is unperforated.

Mounted beneath the hopper and, in the present apparatus, arranged in the lower part of the cylindrical portion of the housing, is a burner 21 which is preferably annular in shape and is arranged beneath the side walls of the hopper. The burner may take various forms but it is desirable that the gas openings or jets should not be formed in the top wall thereof as this would permit them to be clogged by ashes or falling pieces of refuse. I have here shown the burner as comprising two annular portions rigidly connected one to the other and spaced slightly apart to provide annular slots 22 and 23 between the inner and outer edges, respectively, of the two parts of the burner. Thus the gas jets extend laterally and are so arranged that the ashes or other matter will not drop into the same. The burner is connected with a suitable source of gas supply by means of a supply pipe 24. I also prefer to provide an ash pan 25 to receive the ashes falling from the hopper and, in the present instance, the pan is provided with flanges which rest upon and are supported by flanges 26 forming a part of the base 3, thus permitting the pan to be easily placed in and removed from its position under the burner.

In the use of the ordinary incinerator the garbage is deposited in the hopper from time to time as it accumulates and when the hopper is sufficiently filled the gas is lighted at the burner beneath the hopper. The time required for the consumption of the garbage depends upon the quantity and the character thereof but after the garbage has been consumed the attendant must return and shut off the gas and if the attendant forgets or neglects to do this the burner will operate uselessly and the gas will be wasted. To avoid the necessity for this attention I have provided the incinerator with means for automatically controlling the operation thereof so that all that is required of the attendant is to deposit the garbage in the hopper. The character of the controlling means is such that it will not only cause the burner to operate to consume the garbage but will also partially dry the garbage before and between burning operations, thus rendering the same more combustible. The controlling means may take various forms but in that embodiment of the invention here illustrated I have associated with the incinerator a water heater, which may, if desired, be a part of a domestic water heating system and which is so arranged that the water will be heated by the same fire which consumes the garbage, and the heat generated by the burning of the garbage itself will also heat the water, thus accomplishing two results, that is, the incineration of the garbage and the heating of the water, with a consumption of gas little or no greater than would be required to accomplish one of those results. The burner is automatically controlled to maintain the water at a relatively high temperature and when the burner is not in operation this warm water will heat the combustion chamber and cause the evaporation of moisture from the garbage, thereby partially drying the same.

As here shown, a water heating coil 27 is supported about the hopper 9 between the side walls thereof and the walls of the cylindrical body portion of the housing, this coil extending for substantially the full length of the hopper and being spaced both from the hopper and from the housing and thereby arranged in a position in which it will be subjected to heat from the burner 21, will be entirely out of contact with the garbage and will not interfere with the free passage of the heat through the openings in the hopper. The water heating coil is connected at both ends with a water tank 28 which may be of any suitable character and a portion only of which is here shown, the arrangement being such that the water in the tank will circulate through the coil and back to the tank. Preferably the burner is automatically controlled to maintain the water in the tank at the desired temperature and the heat necessary to maintain the water at this temperature is also sufficient to consume the garbage in the hopper. As here shown, the gas supply pipe 24 has interposed therein an automatic valve 29 with which is operatively connected a thermostat 30 which projects into the tank and serves to open the valve and admit gas to the burner when the temperature of the water tank falls below a predetermined degree and to again close the valve when the water has been raised to the desired temperature. Such valves and thermostats are well known in the water heating art and it is not necessary to here illustrate or describe the same in detail. A supplemental gas pipe 31 leads from the supply pipe 24, on the outer side of the valve 29, to a pilot burner 32 arranged adjacent to the main burner 21 and here shown as arranged centrally thereof and directly beneath the unperforated top portion of the dome 19. By this arrangement of the pilot burner the top portion of the dome prevents ashes or refuse from falling into the pilot burner and clogging the same.

The operation of the apparatus will be readily understood from the foregoing description and it will be apparent that the pilot burner 31 will be normally lighted and that gas will be admitted to the main burner at intervals determined by the temperature of the water in the tank. The flame from the burner rising about the outer side of the hopper and entering the dome shaped portion 19 serves not only to heat the water in the coil 27 but also to consume the garbage in the hopper. It is not essential that the burner should burn long enough at any one time to consume all the garbage but the garbage may be deposited in the hopper in such quantity and at such times as may be desired and as the burner operates from time to time to heat the water it will consume the garbage. There is usually a more or less definite relation between the amount of hot water used in a home and the amount of garbage accumulated and consequently the burner will operate at sufficiently frequent intervals to consume the garbage within a reasonable time. Even if no hot water is being used the burner will operate at intervals due to the lowering of the temperature of the water by radiation.

The construction of the apparatus is such that no fumes or odor can escape from the apparatus into the room in which it is located and all products of combustion are carried to the exterior of the house through the outlet 6. If desired, a packing of heat resisting material, such as asbestos, may be inserted between the closure 8 and the flange surrounding the opening 7, to more tightly seal the joint.

It is customary with many people to burn their garbage in the furnace during the winter months, and under such circumstances the incinerator would not be needed but it would be desirable to retain the water heater in operation. This can be done, as the device will operate as a water heater at all times regardless of whether or not it is used as an incinerator but in order to concentrate the heat more effectively on the water pipes a shield 33 of heat resisting material may be inserted in the hopper to close the openings therein.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an apparatus of the character described, a housing having an inlet at the upper end thereof and a closure for said inlet, a hopper supported within said housing, spaced from the side walls thereof and having perforated side walls, said hopper having its open upper end arranged adjacent to said inlet and having its lower end near the lower end of said housing, a perforated closure for the lower end of said housing, having a dome-like portion extending upwardly into said hopper for a relatively short distance from the bottom thereof and spaced from the side walls thereof, said dome-like portion of said closure having its lateral portions perforated and the upper central part imperforate, a main burner supported beneath said hopper, and a pilot burner supported beneath the imperforate part of the upwardly extending portion of said closure.

2. In an apparatus of the character described, a housing, a hopper supported in said housing and spaced from the side walls thereof, a burner supported beneath said hopper, a water heating coil supported about said hopper between the same and said housing, a tank with which said coil is connected, and means controlled by the temperature of the water in said tank for controlling the operation of said burner.

3. In an apparatus of the character described, a housing having an inlet at the upper end thereof and a closure for said inlet, a hopper supported in said housing with its open upper end adjacent to said inlet and having apertured side walls spaced from the side walls of said housing, an apertured closure for the lower end of said hopper, a main burner arranged beneath said hopper, a water heating coil wound about and spaced from said hopper, a tank having circulating connection with said coil, a valve to control the flow of gas to said burner, a thermostat operatively connected with said valve and extending into said tank, and a pilot burner supported adjacent to said main burner.

4. In an apparatus of the character described, a housing having an inlet at the upper end thereof and a closure for said inlet, a hopper supported in said housing with its open upper end adjacent to said inlet and having apertured side walls spaced from the side walls of said housing, an apertured closure secured to the lower end of said hopper, a burner arranged beneath said hopper and having jets arranged respectively beneath said closure and beneath the space between said hopper and said housing, a water heating coil supported in the space between said hopper and said housing, a tank having circulating connection with said coil, a thermostat mounted in said tank, and a valve controlled by said thermostat to control the flow of gas to said burner.

5. In an apparatus of the character described, a housing, a hopper supported in said housing and spaced from the side walls thereof, a burner supported beneath said hopper, a water heating device comprising a part extending about said hopper, and means controlled by the temperature of the water in said heating device to control the operation of said burner.

6. In an apparatus of the character described, a hopper, a water heating device comprising a part surrounding said hopper and spaced therefrom, a burner arranged beneath said hopper and said part of said water heating device, and means controlled by the temperature of the water in said heating device to control the operation of said burner.

7. In an apparatus of the character described, a hopper to receive material to be consumed, a water heating device in heat receiving relation to the hopper, a main burner arranged in operative relation to said hopper and said water heating device, a valve to control the supply of fuel to said main burner, a pilot burner adjacent to said main burner, and means controlled by the temperature of the water in said water heating device to open and close said valve.

8. In an incinerator, a structure having a combustion chamber, a hopper to support the material to be consumed in said combustion chamber and having openings to establish communication between the same and said combustion chamber, an automatically controlled burner arranged below said hopper and means controlled in accordance with the temperature within said combustion chamber to cause fuel to be supplied to said burner.

9. In an incinerator, a structure having a combustion chamber, means to support the material to be consumed in said combustion chamber, a burner arranged below said material supporting means, an automatic valve to control the supply of fuel to said burner, and a thermostat to actuate said valve and cause fuel to be supplied to said burner when the temperature in said combustion chamber falls below a predetermined degree.

10. In an incinerator, a receptacle for material to be consumed, a burner arranged below said receptacle, an automatic valve to control the supply of fuel to said burner, a liquid containing device arranged about the material to be consumed, and means controlled in accordance with the temperature of the liquid in said device to actuate said valve.

11. In an incinerator, a casing structure providing an inner refuse incinerating chamber and a combustion chamber about said refuse chamber, the casing walls separating said chambers having openings therethrough for chamber intercommunication, a burner beneath said chambers, and a thermostatic valve for the burner fuel supply control, influenced by the temperature in said combustion chamber, opening the fuel supply to said burner when the temperature in the combustion chamber falls below a predetermined degree.

12. In an incinerator, a casing structure providing communicating concentric chambers, comprising an inner refuse incinerating chamber and an outer combustion chamber, a burner beneath said chambers, a water heater element within said combustion chamber, and a thermostatic valve for burner fuel supply control in connection with said heater element, to cause said valve to open when the temperature in said heater element reduces a predetermined degree, said heater element constituting an element of a hot water service unit.

In testimony whereof, I affix my signature hereto.

WILLIAM C. EPSTEIN.